United States Patent
Verrier

(10) Patent No.: US 8,533,933 B2
(45) Date of Patent: Sep. 17, 2013

(54) METHOD FOR MANUFACTURING AND TRANSPORT OF A GENERATOR STATOR CORE

(75) Inventor: Michel Verrier, Essert (FR)

(73) Assignee: Alstom Technology Ltd, Baden (CH)

( * ) Notice: Subject to any disclaimer, the term of this patent is extended or adjusted under 35 U.S.C. 154(b) by 704 days.

(21) Appl. No.: 12/641,647

(22) Filed: Dec. 18, 2009

(65) Prior Publication Data

US 2010/0187945 A1   Jul. 29, 2010

(30) Foreign Application Priority Data

Dec. 18, 2008  (EP) .................................... 08172143

(51) Int. Cl.
*H02K 15/02*   (2006.01)
(52) U.S. Cl.
USPC ............................... 29/596; 29/564.1; 29/609
(58) Field of Classification Search
USPC ............. 29/596–598, 732–736; 310/216.131
See application file for complete search history.

(56) References Cited

U.S. PATENT DOCUMENTS

| | | | |
|---|---|---|---|
| 2,327,352 A | | 8/1943 | Vaino |
| 3,845,547 A | * | 11/1974 | Reynolds .......................... 29/596 |
| 3,940,648 A | * | 2/1976 | Wielt et al. ............. 310/216.131 |
| 4,284,920 A | * | 8/1981 | Nelson ........................... 310/432 |
| 4,891,540 A | | 1/1990 | Cooper et al. |
| 5,390,409 A | | 2/1995 | Courtney |
| 6,346,760 B1 | | 2/2002 | Boardman, IV |
| 6,462,457 B2 | * | 10/2002 | Shah et al. ............. 310/216.001 |
| 2002/0074894 A1 | | 6/2002 | Fuller |
| 2005/0235480 A1 | | 10/2005 | Majernik et al. |
| 2005/0236926 A1 | | 10/2005 | Majernik et al. |
| 2007/0214629 A1 | | 9/2007 | Imafuku et al. |
| 2010/0187945 A1 | * | 7/2010 | Verrier .................... 310/216.131 |

FOREIGN PATENT DOCUMENTS

| | | |
|---|---|---|
| CH | 657944 A5 | 9/1986 |
| EP | 0358945 A2 | 3/1990 |
| EP | 0365217 A2 | 4/1990 |
| GB | 376508 A | 7/1932 |
| GB | 1232575 A | 5/1971 |
| JP | 2003070212 A | 3/2003 |

OTHER PUBLICATIONS

European Search Report dated Jun. 17, 2009 which issued during the prosecution of corresponding European Patent Application No. EP08172143; 7 pages.

* cited by examiner

*Primary Examiner* — Minh Trinh
(74) *Attorney, Agent, or Firm* — Leydig, Voit & Mayer, Ltd.

(57) ABSTRACT

A method for manufacturing and preparing for assembly a stator core of a generator, the stator core having a central cylindrical bore along a longitudinal axis of the stator core, the method including in a first step, mounting a first press plate onto a tooling device and concomitantly and/or subsequently positioning at least one key bar to be manufactured in an axial direction with respect to the longitudinal axis in a spaced manner along a peripheral circumference of the first press plate. The method includes in a second step, stacking a plurality of generator laminations onto the first press plate and mechanically coupling the plurality of generator laminations with the at least one key bar and, in a third step, mounting a second press plate onto the plurality of generator laminations, fixing the second press plate to at least one of the at least one key bar and at least one axial fixing device and concomitantly and/or subsequently exerting axial stress on the first and the second press plates.

17 Claims, 2 Drawing Sheets

METHOD FOR MANUFACTURING AND TRANSPORT OF A GENERATOR STATOR CORE

Priority is claimed to European Patent Application No. EP 08172143,3, filed Dec. 18, 2008, the entire disclosure of which is incorporated by reference herein.

The present invention relates to the manufacture of electrical generators, and more specifically to the assembly of stator cores of such generators.

BACKGROUND

In the power generation industry, generator stator cores are supported on mounting frames. In preferred constructions, as mentioned in US 2007/0241629 A1, the stator core is formed from a plurality of stacked laminations, preferably thin steel laminations which are stacked, pressed and clamped together into the large cylindrical form of the stator core. Stacking can take place in a vertical or horizontal position of the stator core. Vertical stacking makes use of gravity to aid in the placement of the laminations. However, after vertical stacking, the stack has to be transferred to a horizontal position for further handling. In case of horizontal stacking, following the stacking step no toppling of the core is necessary for handling and/or winding and/or transport.

Normally the core is located within a frame supporting the core. As in US 2005/0236926 A1, an example for a state of the art frame type is also given in U.S. Pat. No. 5,390,409. As suggested e.g. in EP 0 365 217 A2, key bars positioned along an outer peripheral surface of the generator stator core are commonly welded or bolted in the frame and preferably mechanically coupled to the laminations of the stator core, as disclosed e.g. in U.S. Pat. No. 6,346,760.

SUMMARY OF THE INVENTION

In the state of the art, it is common to manufacture the stator core inside a ready-made frame. If the manufacturing does not take place at the final installation site, which is difficult, because all manufacturing machinery would have to be transferred to every installation site, the final assembly of stator core within the frame has to be transported to said final installation site, e.g. on railway wagons. This is only possible for stator cores of a limited diameter, due to the fixed width of railway wagons, itself limited by the width of railway tracks, tunnels and bridges. However, in the field of electric generators, there is a growing need for larger generators, and, therefore, also larger stator cores.

In U.S. Pat. No. 4,891,540, it is mentioned that significant economies can be achieved due to reduced production time if the stator frame and the core can be manufactured in parallel operations and assembled later. In US 2002/0074894 A1, it is mentioned that the simultaneous construction of the core and the support frame is extremely costly and time consuming. For the purpose of simultaneous construction of stator core and stator frame, typically the frame, due to its larger diameter in comparison with the core, is manufactured at the final installation site. The core then has to be transported to the final installation site for assembly with the frame.

An aspect of the present invention is therefore to provide an efficient way of manufacturing a stator core without a frame, and thereby to provide a possibility to transport large stator cores, which, if they had a frame, could not be transported on trains anymore due to their excessive width. It is a further object of the invention to provide a method for vertical stacking of a stator core without a frame, while yet allowing a safe toppling of the stator core into a horizontal position for transport and a good support during handling and/or transport.

The above-mentioned state of the art cannot solve these problems. No suggestions are made for a frameless stacking of laminations on stator cores and especially no alternative support structures for transport of stator cores are disclosed in the documents of the state of the art.

Therefore, in an embodiment of the present invention a method for manufacturing and preparing for assembly in a generator a stator core having a central cylindrical bore along a longitudinal axis of the stator core includes the steps of:

I: mounting at least one first press plate onto a tooling device and positioning a plurality of key bars in an axial direction with respect to the longitudinal axis of the stator core to be manufactured, in a spaced manner along the peripheral circumference of said first press plate:

II: stacking a plurality of generator laminations onto said first press plate, and concomitantly and/or subsequently mechanically coupling said generator laminations with the key bars;

III: mounting at least one second press plate onto said generator laminations, fixing said press plate to the key bars and/or to at least one axial fixing means and concomitantly and/or subsequently exerting axial stress on said press plates.

In said method, a support element is either mounted before or after step I with one of its axial ends onto the tooling device, thereby defining the position of the axial bore of the stator core to be assembled. The support element can alternatively also be axially inserted after step II or III into the central cylindrical bore of the stator core. In any case, preferably after step III, said support element is releasably fixed to the stator core for support of the stator core during handling and/or transport and/or winding.

In other words, the present invention solves the above problem by supporting the stator core with key bars during the stacking of the laminations and introducing a tube into the stator core after or before stacking, for its support during toppling, if necessary, as well as handling and/or transport. Said tube takes over the supportive function of the stator frame used in the state of the art, however, it does not add to the external diameter of the stator core, as it is inserted into its central bore. This allows to maximize the diameter of the stator core alone, without the frame, to the maximum width of railway wagons or any other transport medium.

The method according to the present invention allows the width and weight added by the stator frame to be saved and thereby allows stator cores of larger diameters to be transported. The tube makes the use and the fixing, e.g. by welding, of a plurality of external plates (so-called web plates) unnecessary, and yet allows toppling and/or winding and/or transport. It also provides a central support to the core, allowing safe mechanical operation of the stator core assembly during transport. As the manufacture of the stator core, i.e. the stacking step, and the welding of the stator frame can be performed simultaneously, the production time can be significantly reduced and thereby higher efficiencies and, consequently, higher economies can be achieved.

In a first preferred embodiment of the present invention, the key bars are arranged in a vertical position and parallel to the vertical longitudinal axis of the stator core to be manufactured at least during step I, preferably during all steps I, II and III.

No suggestions are made in the state of the art to make vertical stacking simpler. US 2005/0235480 A1 even explicitly mentions the need to stack the stator core horizontally instead of vertically. The state of the art only offers improved methods for horizontal assembly of the stator core, e.g. by using key bar extensions, while US 2005/0236926 A1 discloses a central rail structure extending through the centre axis of the stator frame, aiding in the placement and line adjustment of laminations during horizontal stacking within a stator frame.

It is of further advantage, if the support element axially extends beyond at least one axial end, preferably both axial ends of the stator core. The support element e.g. can be a tube. According to a further preferred embodiment of the present invention, the outer diameter of the support element essentially corresponds to the diameter of the stator bore.

In a further preferred embodiment, the key bars are equally distributed along the outer peripheral circumference of the stator core. Furthermore, it is preferred that the key bars are fixed to the first press-plate, preferably in step I, and/or the second press-plate, preferably in step III. The number of key bars positioned around the stator core preferably is in the range of 2 to 8.

Axial stress is preferably exerted on said press plates by fixing said press plates to the key bars in a positive manner, preferably by bolting, and/or in a non-positive manner, preferably by screwing, and/or by an adhesive bond, preferably by welding.

It is further preferred that at least one first press plate and the at least one second press plate are fixed to the key bars and/or the at least one axial fixing means such that the press plates exert oppositely directed forces onto the generator laminations stacked between the first press plate and the second press plate. Preferably said press plates and/or said generator laminations are ring-shaped. The generator laminations can be coupled in a positive and/or non-positive manner and/or by an adhesive bond to the key bars. Said coupling can be carried out during or after step II or during or after step III.

Said stator core preferably has an outer diameter in the range of approximately 3.5 meters to 5.5 meters and preferably a length in the range of approximately 6 meters to 12 meters, preferably approximately 8 meters to 10 meters, and preferably a weight in the range of approximately 300 tons to 500 tons, preferably approximately 350 tons to 400 tons.

Advantageously, the support element is inserted into the stator core after step II or III. However, it can also be mounted or inserted prior to step I or between step I and step II. During steps I, II, and III, the support element preferably remains fixed to the tooling device on at least one of the support element's ends.

Following steps I, II and III, if they were carried out in a vertical position of the stator core, preferably the stator core containing said support element in its central cylindrical bore is transferred into a horizontal position, e.g. by toppling. Said support element remains fixed to the tooling device on at least one of the support element's ends during toppling.

Following steps I, II, and III, the stator core can be subjected to a winding step and/or handling and/or transport and in such cases it is only subsequently assembled with a stator frame. For handling and/or transport, respectively, it is especially advantageous if at least one axial end of the support element is adapted to a transport system or to an intermediate adapting system.

Preferably, after step III, the stator core with the support element disposed in its central cylindrical bore is framelessly transported to a different location. Preferably, the support element is removed from the bore of the stator core after transport and before or after assembly with the stator frame.

According to a first assembly mode, the stator core is manufactured in a first location by a method according to any one of the above embodiments or a combination thereof, while a stator frame is manufactured in a second location. Following the stator core's manufacture in the first location, the stator core is then transported from the first location to the second location for assembly with the stator frame, said second location preferably also being the place of final installation of the generator.

Alternatively, the stator core can be manufactured in a first location by a method according to any one of the above embodiments or a combination thereof, while a stator frame is manufactured in a second location. Following its manufacture in the first location, the stator core is then transported from the first location to a third location, while, following the stator frame's manufacture in the second location, the stator frame is transported from the second location to the third location for assembly and final installation of the generator, provided that said third location is the place of assembly of stator core and stator frame and the place of final installation of the generator.

A further object of the present invention is a stator core with a support element, said stator core being manufactured according to a method according to any one of the preceding embodiments or a combination thereof.

Further embodiments of the present invention are outlined in the dependent claims.

BRIEF DESCRIPTION OF THE DRAWINGS

In the accompanying drawings preferred embodiments of the invention are shown in which.

DETAILED DESCRIPTION

Figure 1:
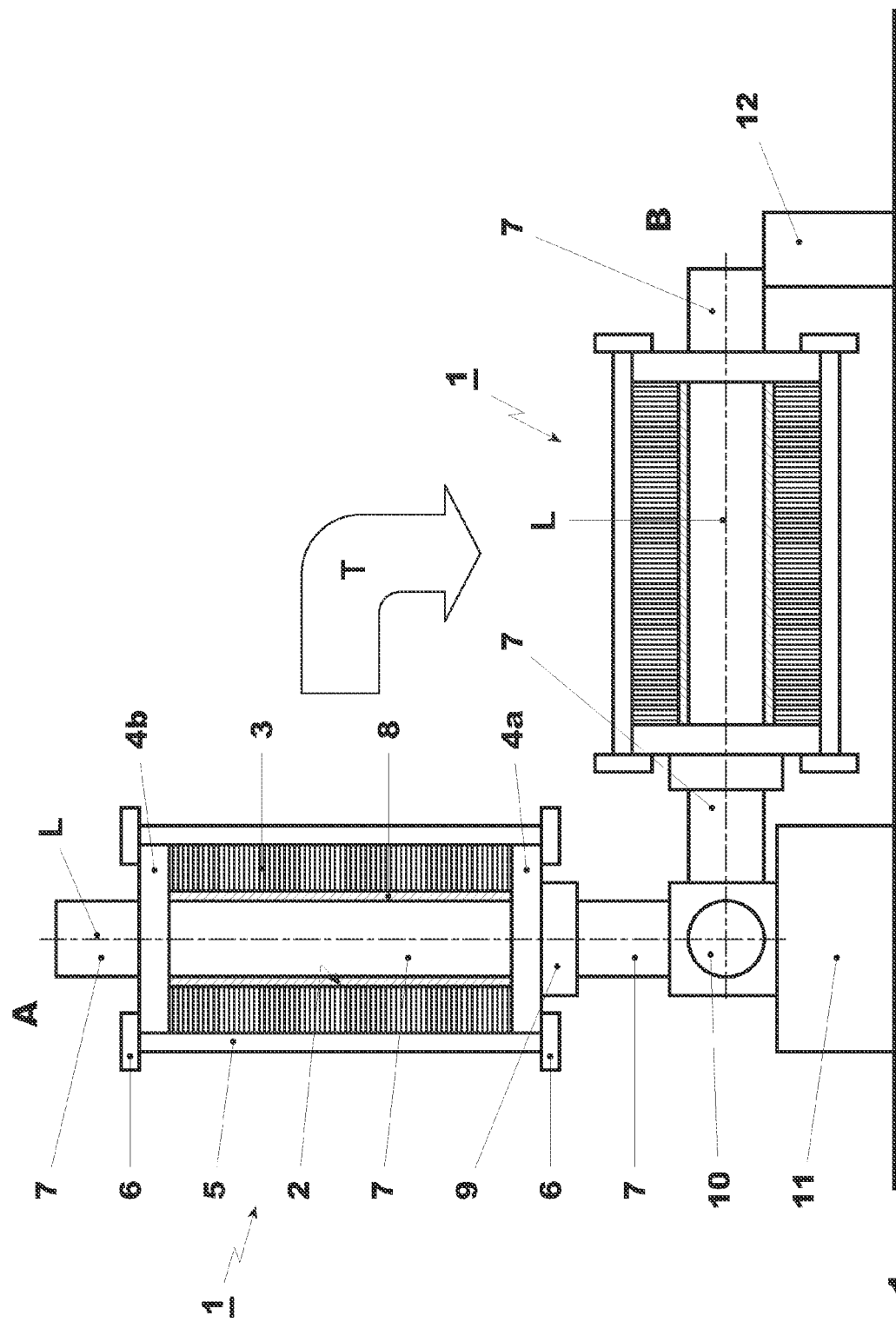
FIG. 1 is a schematic representation of a stator core in vertical position A after stacking on the left, and of the stator core after toppling in a horizontal position B on the right, prepared for winding and/or handling and/or transport.

Referring to the drawings, which are for the purpose of illustrating the present preferred embodiments of the invention and not for the purpose of limiting the same, FIG. 1 shows, on the left, a stator core 1 in vertical position A after stacking. On the right hand side, a stator core is shown in a horizontal position B following toppling T. In its horizontal position after stacking and toppling, the stator core 1 is ready for winding and/or handling and/or transport to a different location. The stator core 1 itself is shown as an axial cut, whereas the other elements are shown schematically.

A stator core 1, which has a central cylindrical bore 2, namely a through bore, generally comprises a stack of laminations 3. With respect to the stator core 1 of FIG. 1, the stacking step is performed vertically along a longitudinal axis A, which extends perpendicular to the plane of the ground 16.

According to the method depicted in FIG. 1, manufacturing of the stator core 1 begins by mounting a support element 7, which can e.g. be a rod or a tube, onto a tooling device 10, preferably a table 9 of said tooling device 10. Stacking of the laminations 3 is then carried out by mounting first at least one first press plate 4a, followed by stacking of preferably ring-shaped laminations 3 on top of each other around the central support element 7. Either a layer of laminations 3 comprises several segments, which, when assembled, define a ring-shape around the support element 7, or each layer comprises one pre-formed ring-shaped lamination 3, which typically is a metal plate, preferably a thin steel plate. After stacking, the laminations 3 form a ring around the tube 7.

However, it is also possible to insert the support element 7 after stacking, as described below.

In any case, whether the support element 7 is mounted prior to stacking or after stacking, as described below, a plurality of key bars 5, of which two are depicted schematically, are accurately positioned on the tooling device 10, i.e. its table 9. Preferably, at least two key bars 5, more preferably three or more key bars 5 are positioned in preferably equal distances along the outer peripheral circumference of the press plate 4a.

Preferably, the tooling device 10 or its table 9, respectively, has a round shape, when viewed from above, and preferably is provided with recesses and/or through bores and/or connection means for the accurate fixation of the key bars 5 thereon. Advantageously, the tooling device 10 or its table 9, respectively, are prepared such that key bars 5 for the manufacture of stator cores 1 of various predetermined sizes can be fixed thereto, e.g. by pre-determined concentrically circumferential rows of recesses for the mounting or anchoring of the key bars 5 therein on one of their two axial ends.

Following the positioning of the key bars 5, a first press plate 4a is mounted on a tooling device 10, preferably on its table 9. At least one press plate 4a is mounted on the tooling device table 9, however, under specific circumstances, more than one press plate 4a can be mounted in sequence before stacking laminations 3 thereupon. The first press plate 4a is inserted between the key bars 5, the key bars 5 defining the outer periphery of said first press plate 4a and/or the stack of laminations 3. Preferably, the press plate 4a and/or each layer of laminations 3 has the same horizontal projection when viewed along the vertical longitudinal axis L of the stator core 1. The press plate 4a shown in FIG. 1 is provided with a central bore 2 and is ring-shaped.

If, as depicted in FIG. 1, the support element 7 is mounted to the tooling device 10 prior to stacking, this can take place prior to or after mounting of the first press plate 4a. The support element 7, as depicted in FIG. 1 as a tube, can be inserted in the central bore of the press plate 4a and coupled to the tooling device 10 and/or its table 9.

In any case, the key bars 5 are fixed at their first axial ends to said first press plate 4a in a positive manner, e.g. by bolting, and/or a non-positive, i.e. force-fit or frictional manner, e.g. by screwing, and/or by an adhesive bond, preferably by welding the key bars 5 to said press plate 4a. Said fixation of the key bars 5 to the first press plate 4a preferably takes place before the laminations 3 are stacked thereon in order to provide axial and radial support as well as guidance during stacking.

In the above mentioned mode, the key bars 5 are mounted on the tooling device 10, or its table 9, respectively, prior to the mounting of the first press plate 4a. However, alternatively, the key bars 5 can be mounted on the tooling device 10 after the mounting of the first press plate 4a.

It is also possible to pre-assemble a set essentially comprising a press plate 4a and a number of key bars 5 fixed thereto. In such a case, the set could be mounted on the tooling device 10 and/or its table 9 for stacking, said press plate 4a and the key bars 5 providing a prepared "cage", i.e. a circumferential and/or radial and a bottom limitation for the stack of laminations 3.

Normally, the type and size and/or diameter of the press plate 4a and the number and positions of the key bars 5 around the circumference of the table 9 and/or the press plate 4a is determined and chosen according to the size, i.e. the diameter, length and weight of the stator core 1 to be manufactured.

Following the positioning of the key bars 5 and the first press plate 4a, as well as the attachment or fixation of the key bars 5 on the first press plate 4a, generator laminations 3, which typically are metal plates, preferably thin, ring-shaped steel plates, are axially stacked, with respect to the longitudinal axis L of the stator core 1, the first lamination 3 being placed on top of the first press plate 4a. In some cases, several laminations 3 can be joined to a distinct set before stacking them onto the first press plate 4a and/or already stacked laminations 3. Such a set of pre-joined laminations 3 is typically called a "donut". Typically, the laminations 3 are stacked to form a stator core 1 of approximately 6 meters to 12 meters, preferably approximately 8 meters to 10 meters in length.

While or after stacking the laminations 3, which can additionally be pressed and/or clamped together, the laminations 3 are fixed to the pre-positioned key bars 5, i.e. a number of laminations 3, preferably all laminations 3 are mechanically coupled to the key bars 5. This can be achieved by coupling in a positive and/or non-positive manner, e.g. by bolting or screwing, and/or by an adhesive bond or force, e.g. by welding. Said coupling typically is achieved by dove tail connections provided on the key bars 5, i.e. dovetails provided on the key bars 5 mate with complementary dovetail recesses on the laminations 3 or vice versa. However, other coupling methods and engaging shapes are also possible.

When the final length of the stack of laminations 3 is reached, a second press plate 4b is mounted on top of the lamination layer last added to the stack. Again, typically, and in the stator core 1 of FIG. 1, one second press plate 4b is mounted on the stack of laminations 3, however, it is possible that two or more press plates 4b are added in sequence. Thereby, the laminations 3 are located between the at least one first press plate 4a and the at least one second press plate 4b.

The key bars 5 can either directly or indirectly over additional adaptor means make contact with the press plates 4a, 4b and/or the laminations 3.

After stacking the laminations 3 onto the lower press plate 4a and placing the upper press plate 4b on the top of the stack of laminations 3, the stator core 1 of FIG. 1, defines a ring-shape with a central cylindrical through bore 2 inside the stator core 1 along its longitudinal axis L.

After mounting the second, according to FIG. 1 namely the upper press plate 4b, axial stress is exerted on the stator core 1 for its fixation and stabilization. For this purpose, preferably the first press plate 4a and/or second press plate 4b is subjected to axial pressure and the second axial ends of the key bars 5 are fixed to the second press plate 4b. The fixation can be exerted in a positive manner, e.g. by bolting, and/or in a non-positive, i.e. force-fit or frictional manner. e.g. by screwing, and/or they are fixed to said preferably ring-shaped press plate 4b by an adhesive bond or force, e.g. by welding. Axial stress can be exerted prior to fixation, e.g. by compression followed by bolting, or concomitantly, e.g. by screwing. Thereby, the first press plate 4a and the second press plate 4b, which are arranged opposite from each other, with the stack of laminations 3 inbetween them, exert opposite axial forces on the stack of laminations 3.

As already mentioned above, according to FIG. 1a support element 7 is mounted to the tooling device 10 and/or its table 9 prior to stacking of the laminations 3. However, according to another embodiment of the invention, the support element 7 is introduced into the central bore 2 of the stator core 1 after the manufacture of the stator core 1. Said support element 7 is e.g. a hollow tube, or a rod or any similar structure with a supportive function being insertable into the bore 2 of the stator core 1. According to FIG. 1, the support element 7 is a tube having an outer diameter essentially corresponding to the inner diameter of the central bore 2 of the stator core 1 to be manufactured. According to the preferred embodiment depicted in FIG. 1, the tube 7 completely fills out the central bore 2 of the stator core 1 and its length preferably extends beyond at least one, preferably beyond both axial ends of the stator core 1. If the support element 7 extends beyond both axial ends of the stator core 1, said support element 7 can be grasped at both of its ends for handling and/or transport of the stator core 1. If the support element 7 only extends beyond one of the two axial ends of the stator core 1, it is advantageous if an adaptor element engages in the other axial end of the stator core 1 for supplemental support during tooling and/or toppling and/or handling and/or winding and/or transport to a different location.

The diameter of the support element or tube 7 preferably is in the range of approximately 1.6 m to 2.4 m, more preferably in the range of 1.8 m to 2.2 m, but can be larger or smaller depending on the size of the stator core 1.

The support element or tube 7 can be fixed axially or radially, preferably axially and radially, to the stator core 1, e.g. to the laminations 3 thereof, e.g. by screwing, engaging bolts or rods penetrating into the tube 7, preferably radially, or by wedgings 8.

One axial end, according to the left part of FIG. 1 the lower axial end of the tube 7 is fixed to the table 9 of the tooling device 10, which, according to FIG. 1 is a pivoting tooling device 10 provided on a tooling base 11.

Thanks to the tube 7, the stator core 1 can be safely toppled over, indicated in FIG. 1 by arrow T, i.e. transferred, from a vertical position A into a horizontal position B, in which it is then ready for further handling. In the horizontal position B, depicted on the right side of FIG. 1, the stator core 1 with the support element 7 disposed in the central bore 2 of the stator core 1, typically undergoes a winding step and/or transport to a location where it is assembled together with a stator frame (not shown) and incorporated in a generator during final installation.

In its horizontal position B after toppling, the stator core 1 according to FIG. 1, is held on both axial ends via the tube 7. One axial end of the tube 7 is releasably attached to the tooling device 10. The other end is attached to or rests on an adapter element or a support means 12. It thereby is possible to handle the stator core 1 without actually touching the stator core 1 itself, but the support element or tube 7 disposed therein and extending beyond the stator core 1.

Figure 2:
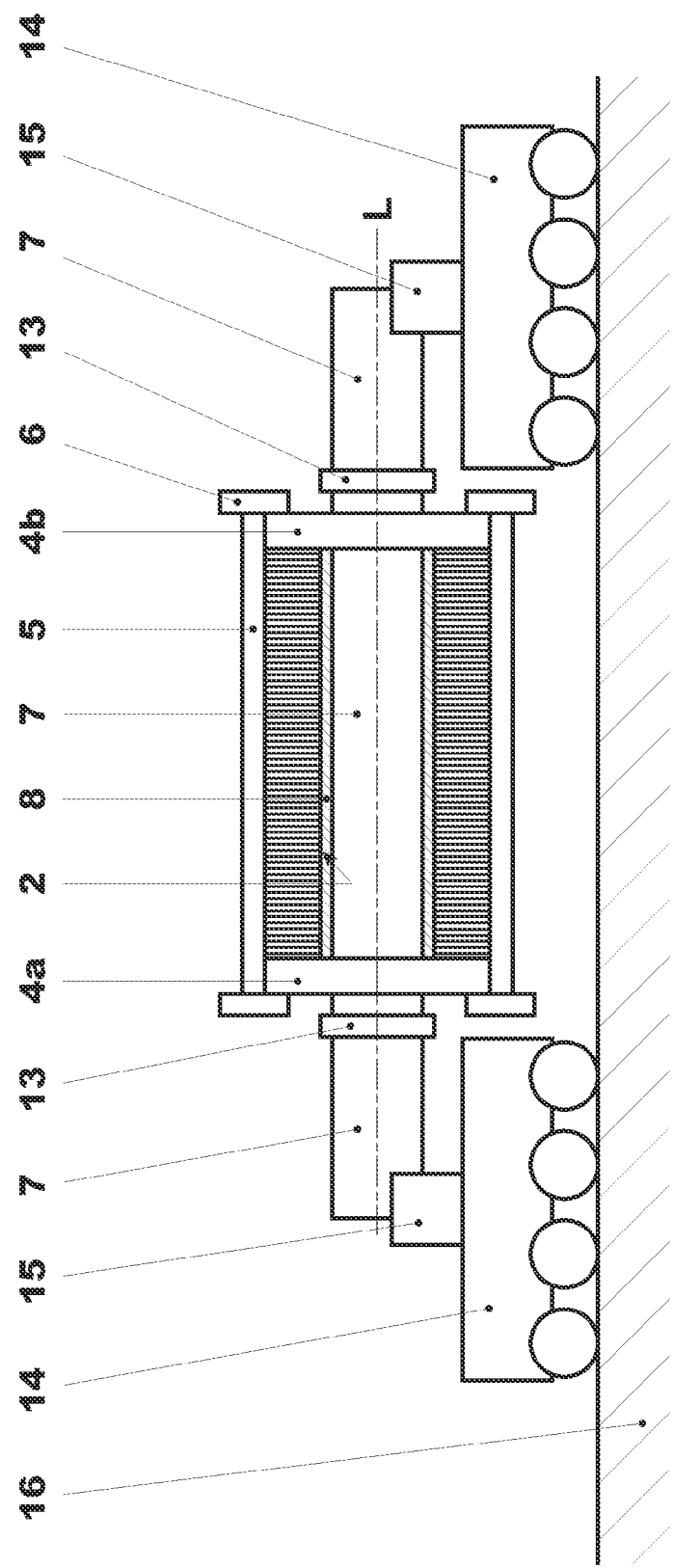
FIG. 2 is a schematic representation of a stator core transport system, wherein said stator core is held in horizontal position during transport by two wagons to a different location for assembly with a stator frame.

From the location of manufacture, termed a first location, the stator core 1 can be transferred to a transport system, as e.g. shown in FIG. 2, or to an intermediate adapting system (not shown) for transport to a second or third location. The support element 7 holds the stator core 1 in its central inner bore 2 and over essentially its entire length, providing an increased support and a homogenous distribution of force over the entire length of the stator core 1.

The support element or tube 7 provides an efficient way of manufacturing and transporting a stator core 1 without a frame, and thereby provides a possibility to transport large stator cores 1, which, if they had a frame, could not be transported anymore, e.g. on trains, due to their excessive width. By using the support element 7 in the present invention, the supportive function, which in the state of the art has been served by the frame on the periphery of the stator core 1, is transferred into the central bore 2 of the stator core 1. Thereby, space is saved with respect to the diameter of the stator core 1, i.e. stator cores 1 of larger diameters can be produced without taking up more width or height during transport. This is particularly important, as in the field of electric generators, there is a growing need for larger and more powerful generators, and, therefore, also larger stator cores 1. The width of railway wagons 14 is limited due to the width of tracks and tunnels. Despite the production of larger stator cores 1, i.e. the maximization of the diameter of stator cores 1, which is enabled by the embodiments of the invention, standard wagons as used for the transport of stator cores 1 in the state of the art can be used.

Furthermore, the invention allows vertical stacking of a stator core 1 without a frame, while yet allowing a safe toppling of the stator core 1 into a horizontal position B for handling and/or transport.

In addition, the present invention allows the stator core 1 to be assembled with the frame on site, i.e. in the place of final installation of the generator.

FIG. 2 shows a stator core transport system, wherein said stator core 1, shown as an axial cut, is held in horizontal position B while being transported by two wagons 14, e.g. by train, the stator core 1 preferably being fastened to the wagons 14 by adaptors 15. According to the embodiment shown in FIG. 2, each axial end of the tube 7 extending out, i.e. beyond an axial end of the stator core 1 is provided with an intermediate flange 13, which can also be any another handling structure or additional supportive structure, and which can either be arranged on the interior or exterior of the tube 7. These flanges 13 aid in keeping the stator core 1 in place on the tube 7, i.e. preventing its shifting on the tube 7, during transport.

According to the embodiment depicted in FIGS. 1 and 2, the stator core 1 is manufactured in a first location, while the stator frame is manufactured in a second location. If the second location is the place of final installation of the generator, e.g. in a power plant, the stator core 1 is transported from the first location to the second location for assembly of the stator core 1 and the stator frame to a set. Subsequently, an installation into the generator of the set comprising a stator core 1 and a stator frame surrounding the stator core 1 can take place. If a third location is the place of final installation of the generator, the stator core 1 and the stator frame are transported from the first location and the second location, respectively, to the third location, where assembly and final installation of the set into the generator take place.

The support element or tube 7 is preferably removed from the central bore 2 of the stator core 1 after transport, either prior to or after assembly of the stator core 1 with the stator frame. Thereby, the support element 7 is an element that can be re-used after removing it from the stator core 1 for the support during the manufacture and/or handling of any subsequently manufactured stator core 1. Thanks to the support element 7, it is possible to handle and transport the stator core 1 without a frame while ensuring its stability, which in the state of the art is always provided by some type of frame, which is heavy and bulky and only allows stator cores 1 of smaller diameters to be produced, compared to the present invention, in which a stator core 1 can be manufactured to have a diameter essentially corresponding to the width of railway wagons 14 or other suitable transport means.

LIST OF REFERENCE NUMERALS 1 stator core
2 central cylindrical bore of stator core 1
3 laminations
4 press plate
5 key bar
6 axial fixing means
7 support element, tube 8 wedging
9 tooling table
10 pivoting tooling device
11 tooling base
12 adaptor element, support means
13 intermediate flange
14 wagon
15 adaptor
16 ground, tracks
A stacking position, vertical position of stator core 1
B transport position, horizontal position of stator core 1
L longitudinal axis of stator core 1
T tilting/toppling movement from position A to position B

What is claimed is:

1. A method for manufacturing and preparing for assembly a suitor core of a generator, the stator core having a central cylindrical bore along a longitudinal axis of the stator core, the method comprising:
   in a first step, mounting a first press plate onto a tooling device and concomitantly and/or subsequently positioning a plurality of key bars to be manufactured in an axial direction with respect to the longitudinal axis in a spaced manner along a peripheral circumference of the first press plate;
   in a second step after the first step, stacking a plurality of generator laminations onto the first press plate and mechanically coupling the plurality of generator laminations with the plurality of key bars;
   in a third step after the second step, mounting a second press plate onto the plurality of generator laminations, fixing the second press plate to at least one of the plurality of key bars and at least one axial fixing device and exerting axial stress on the first and the second press plates;
   providing a support element and performing one of the following steps:
      (i) mounting the support element before the first step so as to position an axial end of the support element on the tooling device so as to define a position of the cylindrical bore,
      (ii) mounting the support element after the first step so as to position the axial end of the support element on the tooling device so as to define the position of the cylindrical bore,
      (iii) axially inserting the support element into the cylindrical bore after the second step, or
      (iv) axially inserting the support element into the cylindrical bore after the third step; and
   releasably fixing the support element to the stator core so as to support the stator core during at least one of handling, transporting and winding after the third step.

2. The method as recited in claim 1, wherein the positioning the plurality of key bars includes arranging the plurality of key bars in a vertical position and parallel to the longitudinal axis.

3. The method as recited in claim 1, wherein the axially inserting the support element into the cylindrical bore occurs after one of the second step and the third step.

4. The method as recited in claim 1, further comprising transferring the stator core into a horizontal position wherein the support element remains fixed to the tooling device on the axial end of the support element following the first, second and third steps.

5. The method as recited in claim 1, further comprising assembling the stator core with a stator frame subsequently to at least one of the winding and the transporting and removing the support element from the cylindrical bore after the transporting and one of before and after the assembling.

6. The method as recited in claim 1, wherein the transporting includes transporting the stator core with the support element disposed in the cylindrical bore framelessly to a different location.

7. The method as recited in claim 1, wherein the support element axially extends beyond at least one axial end of the stator core.

8. The method as recited in claim 1, wherein the support element is a tube.

9. The method as recited in claim 1, wherein the support element includes an outer diameter corresponding to a diameter of the stator core.

10. The method as recited in claim 1, wherein the axial end of the support element is adapted to one of a transport system and an intermediate adapting system.

11. The method as recited in claim 1, wherein the plurality of key bars are equally distributed along an outer peripheral circumference of the stator core.

12. The method as recited in claim 1, wherein the plurality of key bars are fixed to at least one of the first press plate and the second press plate.

13. The method as recited in claim 1, wherein the exerting axial stress includes fixing the first and the second press plates to the plurality of key bars in at least one of a positive manner, a non-positive manner and by an adhesive bond.

14. The method as recited in claim 1, wherein the exerting axial stress includes fixing the first press plate and the second press plate to the plurality of key bars and exerting oppositely directed forces onto the plurality of generator laminations stacked between the first press plate and the second press plate.

15. The method as recited in claim 1, wherein the mechanically coupling the plurality of generator laminations includes coupling the plurality of generator laminations to the plurality of key bars in at least one of a positive manner, a non-positive manner and by an adhesive bond.

16. The method as recited in claim 1, wherein the plurality of key bars includes a number of keys in a range of 2 to 8, the stator core has an outer diameter in a range of 3.5 meters to 5.5 meters and the stator core has a weight of approximately 300 tons to 500 tons.

17. A method of manufacturing a generator stator comprising: manufacturing a stator core in a first location, the stator core having a central cylindrical bore along a longitudinal axis of the stator core, wherein the manufacturing includes:
   in a first step, mounting a first press plate onto a tooling device and concomitantly and/or subsequently positioning a plurality of key bars to be manufactured in an axial direction with respect to the longitudinal axis in a spaced manner along a peripheral circumference of the first press plate;
   in a second step after the first step, stacking a plurality of generator laminations onto the first press plate and mechanically coupling the plurality of generator laminations with the plurality of key bars;
   in a third step after the second step, mounting a second press plate onto the plurality of generator laminations, fixing the second-press plate to at least one of the plurality of key bars and at least one axial fixing device and exerting axial stress on the first and the second press plates;
   providing a support element and performing one of the following steps:

(i) mounting the support element before the first step so as to position an axial end of the support element on the tooling device so as to define a position of the cylindrical bore,
(ii) mounting the support element after the first step so as to position the axial end of the support element on the tooling device so as to define the position of the cylindrical bore,
(iii) axially inserting the support element into the cylindrical bore after the second step, or
(iv) axially inserting the support element into the cylindrical bore after the third step; and releasably fixing the support element to the stator core so as to support the stator core during at least one of handling, transporting and winding alter the third step;

manufacturing a stator frame in a second location;

transporting the manufacture stator core from the first location to the second location; and assembling the stator core and stator frame.

* * * * *